United States Patent [19]

Newell

[11] Patent Number: 4,746,079
[45] Date of Patent: May 24, 1988

[54] SPOOL FOR FISHING REEL

[76] Inventor: Carl W. Newell, 955 Avonoak, Glendale, Calif. 91206

[21] Appl. No.: 865,773

[22] Filed: May 22, 1986

[51] Int. Cl.$^4$ .................. B65H 75/02; B65H 54/553; B65H 75/14; B65H 75/18
[52] U.S. Cl. .................. 242/129.7; 242/84.1 R; 242/118.4; 242/118.7; 264/46.7
[58] Field of Search .................. 242/84.1 R, 84.2 R, 242/84.2 A, 211-221, 118.4, 118.7, 129.5, 129.7, 129.71, 129.6, 85, 106

[56] References Cited

U.S. PATENT DOCUMENTS

| | | | |
|---|---|---|---|
| 1,585,236 | 5/1926 | Doehler et al. | 242/118.4 |
| 2,859,924 | 11/1958 | Sarah | 242/217 |
| 2,985,402 | 5/1961 | Holahan, Jr. | 242/118.4 |
| 3,233,846 | 2/1966 | Polevoy | 242/217 |
| 3,403,871 | 10/1968 | Rebillet | 242/118.7 |
| 4,289,283 | 9/1981 | Morimoto | 242/84.2 R |
| 4,451,012 | 5/1984 | Puryear | 242/84.2 A |

Primary Examiner—Stanley N. Gilreath
Attorney, Agent, or Firm—Harlan P. Huebner

[57] ABSTRACT

A spool for a fishing reel made of engineering polymer and fitted on a shaft for rotation. The shaft may include a number of peripheral protrusions therearound to present a greater linear surface of contact to assure a bonding of the polymer and shaft to withstand lateral line pressure and to aid in reducing the shrinkage of the polymer during drying in the molding process or other locking means may be employed to prevent movement.

10 Claims, 4 Drawing Sheets

SPOOL FOR FISHING REEL

BACKGROUND OF THE INVENTION

1. Field of the Invention.

The invention relates to a spool for a fishing reel to receive fishing line.

2. Description of the Prior Art.

Heretofore spools for fishing reels have usually been stamped or die casted from metal. The disadvantage of such spools for fishing is the tendency to corrode when exposed to the elements. The corrosion could cause not only weakening or failure of the metal but also could effect the rotation of the spool because of corrosion moving into the gears and shafts. Further, metal spools have been found to not have the fine dimensional accuracy which may be required in good reels. Finally, metal spools are heavy and when added to a fishing reel cause considerable weight which could impede casting of line from the reel and pole combination.

in addition, the metal spools of the prior art are formed of two pieces which are butted together and under lateral string pressure separate and cause a binding of the spool in the reel or a "blow out" of the spool.

Finally, the spools made of metal either in a single or double piece have to be drilled for mounting a shaft. As the bore would be smooth there was no true interfit of the bore and shaft and it would be easy for the spool to spread or "blow out" under pressure.

In addition, the metal spools of the prior art are minum to compensate for the weight disadvantage, aluminum is usually soft and can deform or spread much easier than steel and the spool could again cause binding and malfunction.

SUMMARY OF THE INVENTION

It is an object of the present invention to provide a fishing line spool to be manufactured from an engineering polymer such as a plastic compound with graphite therein as a one piece structure or fitted to a shaft of other material.

It is another object of the the present invention to provide a shaft with locking means such as an irregular surface whereby a plastic single piece spool may be molded therearound.

Another object of the present invention is to provide a spool that will not become laterally deformed due to mono-compaction of fishing line, such as monofilaments, thereon.

A further object of the present invention is to provide a spool for a fishing reel which is light weight and relatively inexpensive to manufacture.

A still further object of the present invention is to provide a plastic spool which has a memory so that should a fishing line cause mono-compaction and lateral movement of the spool the same will return to its original shape when pressure has been released.

A further object of the present invention is to provide a spool for a fishing reel wherein the angles of the interior annular end plates of the spool are greater than the prior art and also that there are ribs on the exterior of the end plates of the spools to increase stability and strength.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which.

DETAILED DESCRIPTION OF THE PREFERRED EMBODIMENT

Figure 1:
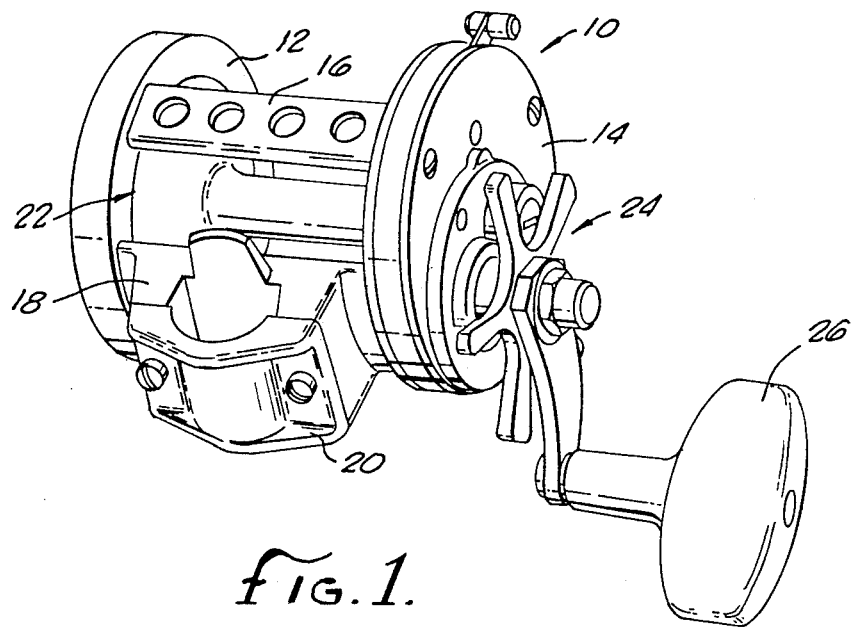
FIG. 1 is a perspective view of a fishing reel and the spool of its present invention mounted therein.
Figure 2:
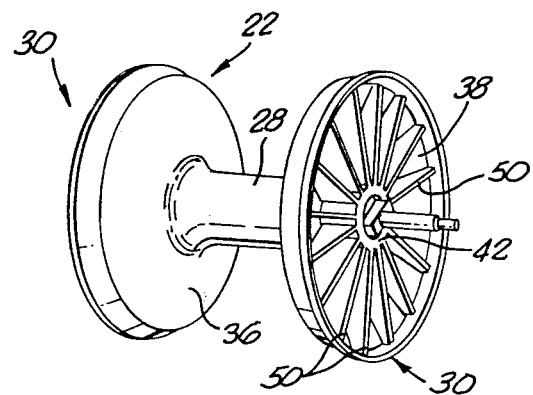
FIG. 2 is a perspective view of the spool of the present invention.

In FIG. 1 there is illustrated a fishing reel generally designated 10. The reel 10 includes a pair of conventional side plates 12 and 14 separated by one or more support posts 16 and a frame base 18. The frame base 18 includes a bridge which extends between the side plates 12 and 14. The frame base 18 fits on a fishing pole and the reel 10 is held on the pole by a clamp 20 which surround the pole and is screwed or otherwise secured to the base 18.

Also rotatably mounted between the side plates 12 and 14 is a spool of the present invention generally designated 22 on bearings not shown.

In addition, the reel 10 includes a conventional line star brake and drag mechanism 24. Attached to the mechanism 24 through gearing not shown is a power handle 26 to rotate the spool 22 and wind the fishing line on or of the spool 22.

The spool 22 is preferably made of an engineering polymer such as a plastic where graphite is added to strengthen the softer plastic and achieve the desired material. The spool 22 is preferably unitary and includes an annular elongated core 28 extending between a pair of annular end plates designated 30. However, without departing from the scope of the invention the spool 22 could be made in two identical end mating portions. Each annular end plate includes an interior angled surface 34 and 36.

On the exterior of the plates 28 and 30 there are provided interior projecting annular recesses 38 and 40 respectively. Radiating outwardly from a hub 42 and 44 to the rims 46 and 48 respectively are a plurality of strengthening ribs 50.

The spool 22 is formed around a shaft generally designated 50 preferably made of metal. One of the keys to the marriage of the spool 22 and shaft 60 is a locking means or various interruptions or protrusions 62 that break up the smooth annual surface of the shaft core 64.

Figure 3:
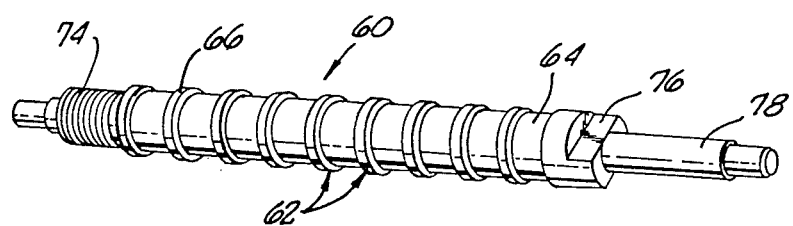
FIG. 3 is a perspective view of the shaft upon which the spool is formed.
Figure 4:
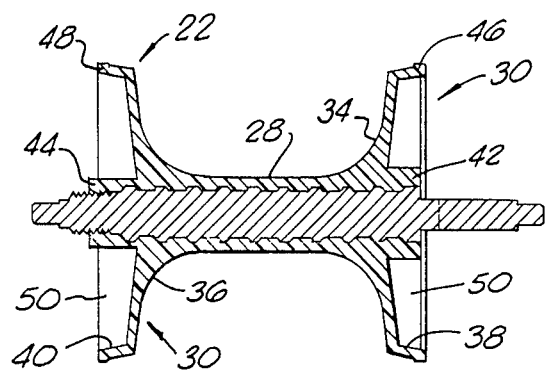
FIG. 4 is a cross sectional view of the spool and shaft of the present invention.
Figure 5:
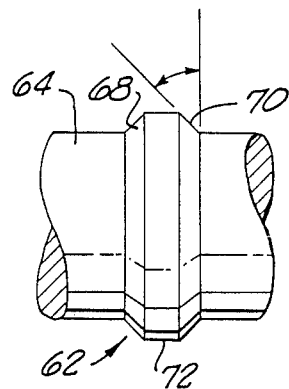
FIG. 5 is an enlarged detail view of an interruption on the shaft of the present invention to be surrounded by plastic to assure intimate contact of the plastic spool and shaft.
Figure 6A:
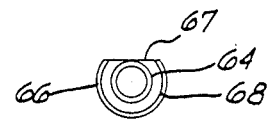
FIG. 6a is an end view of a protrusion with an offset flat portion.
Figure 6:
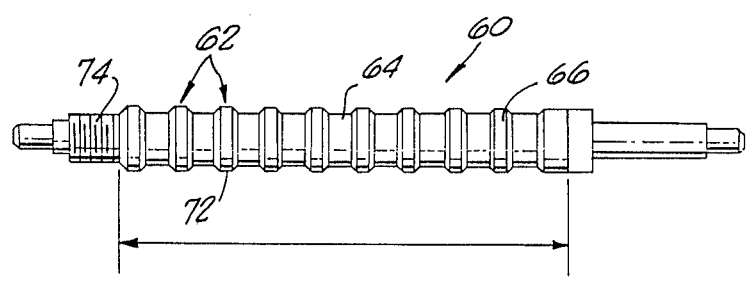
FIG. 6 is a side elevational view of a shaft similar to FIG. 3.

In the case of the protrusions 62 in FIGS. 3 and 6 they are annular rings 66 that include sides 68 and 70 that are angles inwardly toward each other, see FIG. 5, to the annular crown or top surface 72. The angle as represented by the arrow in FIG. 5 is advisable when forming the spool 22 on the shaft 60 to assure the flow of plastic and coating the entire shaft 60 and to prevent plastic shrinkage.

In FIGS. 3 and 6 there are a number of annular rings 66 that extend around the shaft core 64 for the length of the spool 22 as represented by the arrow in that figure. Conventionally the shaft core 64 projects into a threaded shank 74 to receive a conventional ratchet, not shown, for engaging a pawl, not shown, when the spool 22 is mounted in bearings not shown inside plates 12 and 14.

At the other end of the shaft core 64 a conventional flattened locking lug 76 is formed to engage the appropriate drag mechanism 24. The shaft core 64 projects therebeyond in a bearing receiving shank 78.

Figure 7:
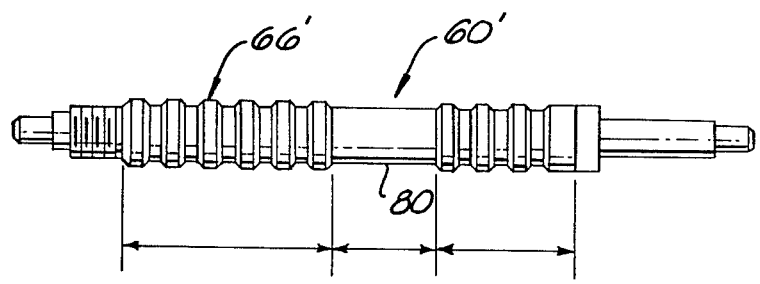
FIG. 7 is a shaft with modified spacing of interruptions thereon.
Figure 8:
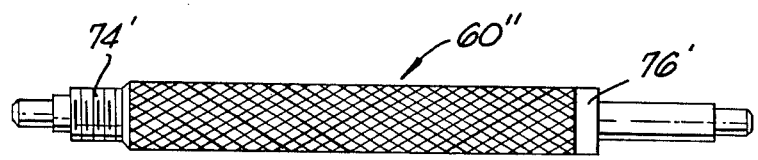
FIG. 8 and 9 are similar to FIG. 7 illustrating various other types of interruptions or protrusions adopted to interlock with the spool.
Figure 9:
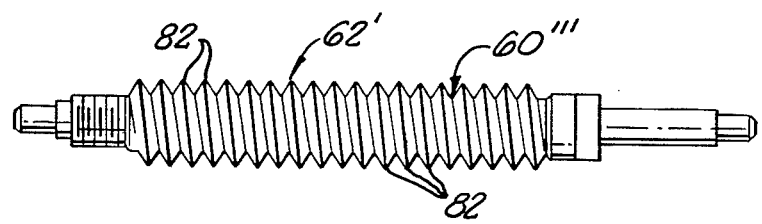

In FIGS. 7, 8 and 9 there are illustrated other shafts 60' and 60". In the case of shaft 60'. FIG. 7, the rings 66 are as shown in FIGS. 3 and 6. The difference resides in the spacing of the rings. In the case of FIG. 7 there are a greater number of rings 66' to the left of center than there are to the right of center. The space 80 is greater than with equadistance rings 66'.

In addition to the annular shapes of the protrusions 62 or rings 66 and 66' it may be advantageous to further assure that the core 64 does not break away and turn around the spool 22 during use and rotate independently of the core. To achieve a proper locking against rotation, one or more of the annular protrusions 62 may be made out of round, fattened or upset. An easy way to accomplish this is to file flat a portion of the annular top surface 72 or ring 66 forming a flat surface 67, see FIG. 6a. In this way rotation of the spool independent of the core 64 is prevented.

With regard to shaft 60" of FIG. 8 the surface is preferably knurled therearound and therealong to create the bonding surface for the engineering polymer. The end parts 74' and 76' remain the same.

In FIG. 9 another form of protrusion 62' is shown. In this view there are a number of course annular pitched threads 82 formed around the periphery of and along the shaft 60'''.

Figure 10:
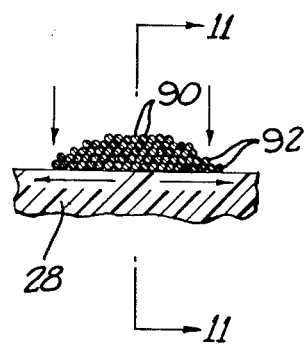
FIG. 10 illustrates windings of fishing line on the spool with arrows to designate compaction and particularly lateral mono-compaction of the line.
Figure 11:
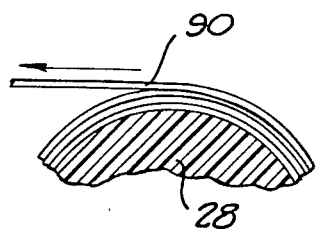
FIG. 11 illustrates the drawing of a non-filament line and is taken on line 11—11 of FIG. 10.

It is now important to understand the force or monocompaction which may be exerted on the end plates 30 during use of the reel 10. FIGS. 10 and 11 illustrate a fishing line 90 which is wrapped in a series of rows 92 around the annular core 28 of the spool 22. Normally when using a fishing line 90 particularly of the monofilament type the line tends to stretch as it is used. In other words, wrapped on top of the first layer 92 on the core 38 is a second layer 92 wherein the line is nested between two sided by side convolutions. As the upper convolution is wrapped and tightened downward in the direction of the vertical arrows in FIG. 10 against the shaft cord 28 there is pressure exerted and the convolution of line 90 in the second layer will try to urge the lower convolution laterally apart, see horizontal arrows in FIG. 10. This will exert outward pressure against the interior angled surfaces 34 and 36 of the spool. This pressure is repeated with each succeeding layer of convolutions until the pressure or compaction builds up and tries to move the end plates 30 outward or create a "blow out".

With the present unitary spool structure and the shaft 60 there is assured a tight, non-slip fit and bond. Also the interlocking of shaft 60 and spool 22 allows the end plates 30, particularly with the reinforcement ribs 50 and steep interior angled surface, to resist distortion by the mono-compaction. In addition, the one piece structure of the spool 22 will assist and prevent the outward pressure or at least restrict it and prevent interference with the rotating action of the spool. Further, with the spool 22 being formed of plastic, if a selection is made wherein the plastic has a memory, any minor distortion of the spool end plates 30 would be relined when the pressure was stopped by stopping the winding in the line onto the spool.

Figure 14:
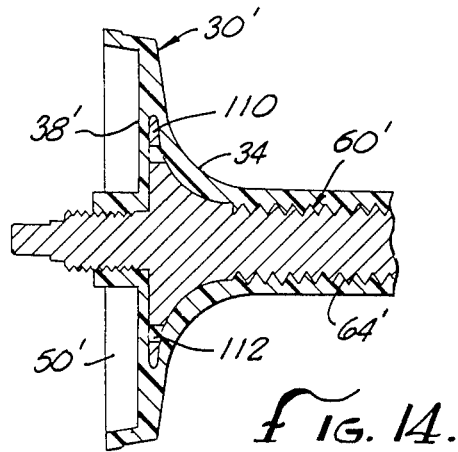
FIG. 14 is a further modified shaft with reinforcing end plates.
Figure 15:
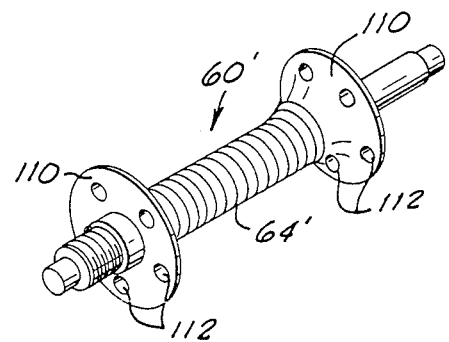
FIG. 15 is a perspective view of the modified shaft of FIG. 14.

In the embodiments of FIGS. 14 and 15 the elongated shaft 50' includes a pair of annular strengthening end plates 110 which radiate from the shaft core 64'. The end plates 110 are preferably formed with a series of holes 112. When the shaft 50' is molded to the spool 22 plastic will flow through the holes 112, see FIG. 14 and assure a proper bonding.

As can be seen from FIG. 14 the annular strengthening end plates 110 are molded into the respective annular end plates 30' between the interior angled or curved surface 34' and the exterior annular recess 38'. These strengthening end plates 110 and the ribs 50' will insure adequate protection from lateral "blow out" of the spool 22' by the mono-compaction of line 90.

Figure 16:
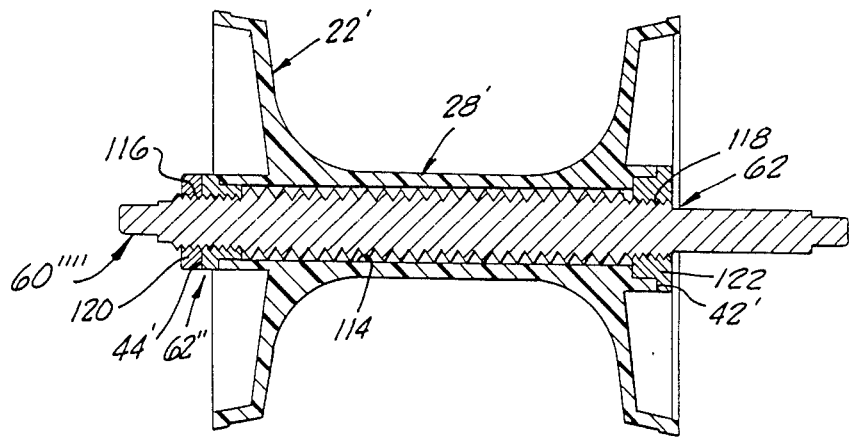
FIG. 16 is another modified spool with shaft locking means.

FIG. 16 illustrates another form of locking means 62" that can be used. It may be desired to separately form the plastic spool 22' and mount it on the shaft 60'''' that may or may not have interruptions.

If the spool 22' is formed as in the previous paragraph it may be sweged or press fitted on the shaft 60'''' and locking means 62" may hold the parts together. The locking means would preferably include threaded ends 116 and 118 and nuts 120 and 122 to bear against hubs 42' and 44'. As the nuts 42' and 44' are tightened the shaft 60'''' will be cinched to the spool and independent lateral movement of the shaft from the spool is prevented.

Figure 13:
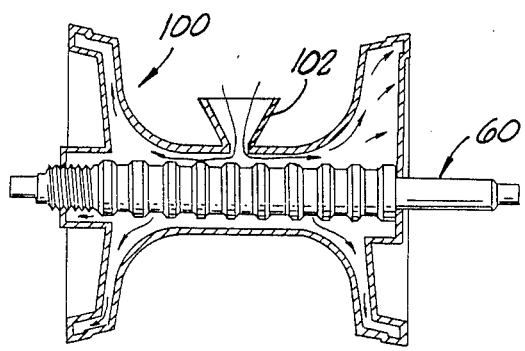
FIG. 13 is a side cross sectional view of the mold for making the spool taken on line 13—13 of FIG. 12.
Figure 12:
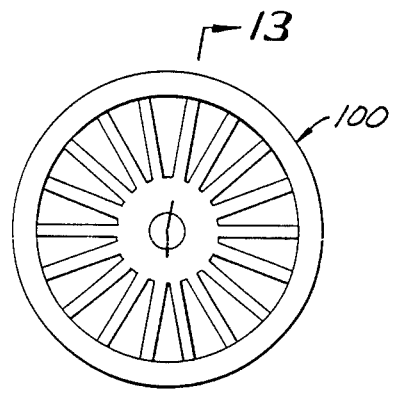
FIG. 12 is an end view of a mold for making the spool of the present invention.

In the manufacture of the spool 22 the preferred practice is to form a mold 100, see FIGS. 12 and 13, to the dimensions of the annular core 28, end plates 30, interior angled surface 34 and 36, recess 38 and 40, hubs 42 and 44, rims 46 and 48 and ribs 50. The shaft 60 is then mounted within the mold 100 and held in place. The mold 100 also has a gate 102 communicating with the central area of the annular core to receive the plastic. As the engineering polymer is injected into the mold 100 it will flow in both directions toward the respective end plates 30.

With the protrusions 62 on the shaft 60 there is a greater area of contact with the flowing plastic as it is inserted through the gate 102. These interruptions help to prevent the plastic from shrinking as it is cooling. This in turn will prevent malformations of spools 22 and assure an even distribution of plastic along the shaft 60. In addition, with the rings 66 or other protrusions a better lock of the plastic annular core 28 around the shaft 60 is achieved. This will prevent the shaft 60 from slipping or working its way loose from the spool and also hold the plastic against end plate "blow outs."

It has also been found that in the manufacture of the completed spool 22 the use of a bonding agent to bond metal to plastic is advantageous. In order to accomplish this the shaft 60 just prior to mounting in the mold 100 may be coated with a conventional bonding agent so that as the plastic is injected a greater bond between metal and plastic is created. This will prevent independent rotational movement of the spool 22 from the shaft 60 or core 64 during use of the spool in a reel 10.

While the exact positioning of the protrusions 62 is not critical it has been found that having them spaced thoughout the area to be covered by the plastic annular core will assure the lock and prevent the lateral distortion and shrinkage.

As the plastic flows into the mold 102 the entire spool is formed as one integral unitary piece with the shaft embedded therein.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A spool of engineering polymer for use in a fishing reel for the winding and unwinding of fishing line thereon, said spool adapted for rotary mounting in said fishing reel, said spool comprising:

an annular line receiving core having opposed end areas;

a pair of annular end plates each projecting radially from and merging with one of said end areas, said plates each having an annular interior sloping surface flowing from said annular core wherein there is formed an annular recess therebetween to receive said fishing line, each of said annular end plates having an exterior annular recess with a centrally located hub and a plurality of strengthening ribs radiating from each of said hubs in said recesses;

said core and said pair of annular end plates are of unitary single construction;

a shaft of other than said spool material extending beyond said pair of annular end plates for journaling in said fishing reel to facilitate rotation of said spool within said reel, said shaft having a shaft core and said shaft being fitted into said annular core and said end plates;

locking means in the form of at least one interruption along said shaft core upsetting the surface of said shaft core to present a surface area to assure a locking fit to prevent lateral movement of said shaft within said space and restrict unwanted shrinking of said polymer as it dries associated with said shaft and said annular core, and threads on the portions of said shaft projecting beyond said respective hubs, and nuts thereon adapted to be tightened against said hubs to assure addition prevention of lateral movement of said shaft independent of said spool.

2. A spool as defined in claim 1 wherein there are a plurality of interruptions which are protrusions on said shaft core.

3. A spool as defined in claim 2 wherein said protrusions are a plurality of rings projecting from said shaft core having sides and a top portion elevated away from the plane of said shaft core.

4. A spool as defined in claim 3 wherein said top portion of a protrusion is out of round, whereby independent rotation of said spool and said shaft is prevented.

5. A spool as defined in claim 3 wherein the sides of said rings are tapered inwardly toward each other.

6. A spool as defined in claim 3 wherein said rings are equally spaced one from the other.

7. A spool as defined in claim 2 wherein said protrusions are annular pitched threads extending along said shaft core.

8. A spool as defined in claim 1 wherein said shaft core includes opposed end strengthening projections radiating from said shaft core adapted to be encapsulated within each of said annular end plates of said spool between said annular sloping surface and said exterior annular recess, whereby additional lateral strength may be added to said spool.

9. A spool as defined in claim 8 wherein the opposed end strengthening projections are annular plates and extend annularly around the interior of said end plates.

10. A spool as defined in claim 9 wherein said opposed annular plates each include a plurality of holes therethrough whereby said spool medium forming said end plates can communicate through said holes to assure proper bonding of said spool and said shaft.

* * * * *